United States Patent
Forster et al.

(10) Patent No.: US 7,313,848 B2
(45) Date of Patent: Jan. 1, 2008

(54) CANOPY RELEASE BUCKLE WITH DUAL ACTION RELEASE LEVER

(75) Inventors: Mark Forster, Diamond Bar, CA (US); Joseph Martin, Claremont, CA (US)

(73) Assignee: H. Koch & Sons, Co., Inc., St. Petersburg, FL (US)

( * ) Notice: Subject to any disclaimer, the term of this patent is extended or adjusted under 35 U.S.C. 154(b) by 502 days.

(21) Appl. No.: 10/784,096

(22) Filed: Feb. 23, 2004

(65) Prior Publication Data

US 2007/0143973 A1 Jun. 28, 2007

(51) Int. Cl.
*A44B 11/25* (2006.01)
(52) U.S. Cl. .......................................... 24/645; 24/637
(58) Field of Classification Search ................ 24/636, 24/637, 639, 640, 641, 645, 650, 638, DIG. 36; 244/151 A, 151 B; 297/468; 280/801.1
See application file for complete search history.

(56) References Cited

U.S. PATENT DOCUMENTS 3,255,502 A * 6/1966 Hollins ........................ 24/191
5,857,247 A 1/1999 Warrick et al. ................ 24/603

* cited by examiner

*Primary Examiner*—James R. Brittain
(74) *Attorney, Agent, or Firm*—Kenneth L. Green; Edgar W. Averill, Jr.

(57) ABSTRACT

A dual action canopy release for releasably holding a parachute harness securement strap in a buckle. The canopy release may be activated by a forward movement of a lever arm or a rearward movement of the lever arm. The lever arm cooperates with an actuating lever having a first position, wherein the actuating lever holds a latch in a locked position, and a second position, wherein the actuating lever releases the latch thereby allowing the latch to move to an unlocked position. Either the forward movement or the rearward movement of the lever arm causes the actuating lever to move to the second position. In the unlocked position, the latch allows parachute harness securement strap to be withdrawn from the buckle.

20 Claims, 4 Drawing Sheets

CANOPY RELEASE BUCKLE WITH DUAL ACTION RELEASE LEVER

BACKGROUND OF THE INVENTION

The field of the invention is harness assemblies and the invention relates more particularly to buckle systems for releasing one portion of a harness assembly from another portion. One critical type of buckle is used to release a parachute canopy harness from the portion of the harness worn by a member of the crew of an aircraft.

U.S. Pat. No. 5,857,247 shows a particular style of harness assigned to the assignee of the present invention. The '247 patent is incorporated herein by reference for purposes of background and the harness shown in the '247 patent releases the parachute only when a lever is moved in a single direction. For some applications, it is beneficial that the lever release a parachute harness when moved either in a forward direction or a rearward direction.

BRIEF SUMMARY OF THE INVENTION

The present invention is for a dual action canopy release for releasably holding a parachute harness securement strap in a buckle. The canopy release may be activated by a forward movement of a lever arm or a rearward movement of the lever arm. The lever arm cooperates with an actuating lever having a first position, wherein the actuating lever holds a latch in a locked position, and a second position, wherein the actuating lever releases the latch thereby allowing the latch to move to an unlocked position. Either the forward movement or the rearward movement of the lever arm causes the actuating lever to move to the second position. In the unlocked position, the latch allows parachute harness securement strap to be withdrawn from the buckle. Thus, the dual action canopy release releases a parachute harness when the lever arm is moved either in a forward direction or a rearward direction.

In accordance with one aspect of the invention, there is provided a buckle having a frame with a forward end and a rearward end, which buckle supports a latch which may be pivoted between a locked counter clockwise position and a released clockwise position. The latch is biased in a released clockwise position, but is held in a locked counter clockwise position by contact with a latch holding ledge supported by an actuating lever. The actuating lever has a distal end and a pivot end and the actuating lever is pivotable between a latch holding clockwise position and a latch releasing counter clockwise position. The actuating lever is biased toward the latch holding clockwise position. A lever arm is pivotally held by a lever arm pivot pin on the distal end of the actuating lever and extends upwardly therefrom. The lever arm has a distal, finger-contacting end and a pivot end.

When the distal finger-contacting end of said lever arm is moved rearwardly, the lever arm contacts a contacting end of said actuating lever and pulls the distal end of the actuating lever so that the actuating lever rotates in a counter clockwise direction to the latch releasing counter clockwise position.

The lever arm includes a forward facing surface between the pivot end and the distal finger-contacting end. A contacting member is secured to the frame and positioned so that a rearward edge of the contacting member is aligned with the forward facing surface of the lever arm. In this manner, when the distal, finger-contacting end of the lever arm is moved forwardly, the forward facing surface contacts the contacting member and lifts the lever arm pivot pin, thereby rotating said actuating lever in a counter clockwise direction to the latch releasing counter clockwise position. Thus, the buckle opens whether the lever arm is moved in a forward direction or a rearward direction.

BRIEF DESCRIPTION OF THE SEVERAL VIEWS OF THE DRAWING

FIG. 1 is a cross-sectional side view of the dual action canopy release buckle of the present invention.

DETAILED DESCRIPTION OF THE INVENTION

Figure 1A:
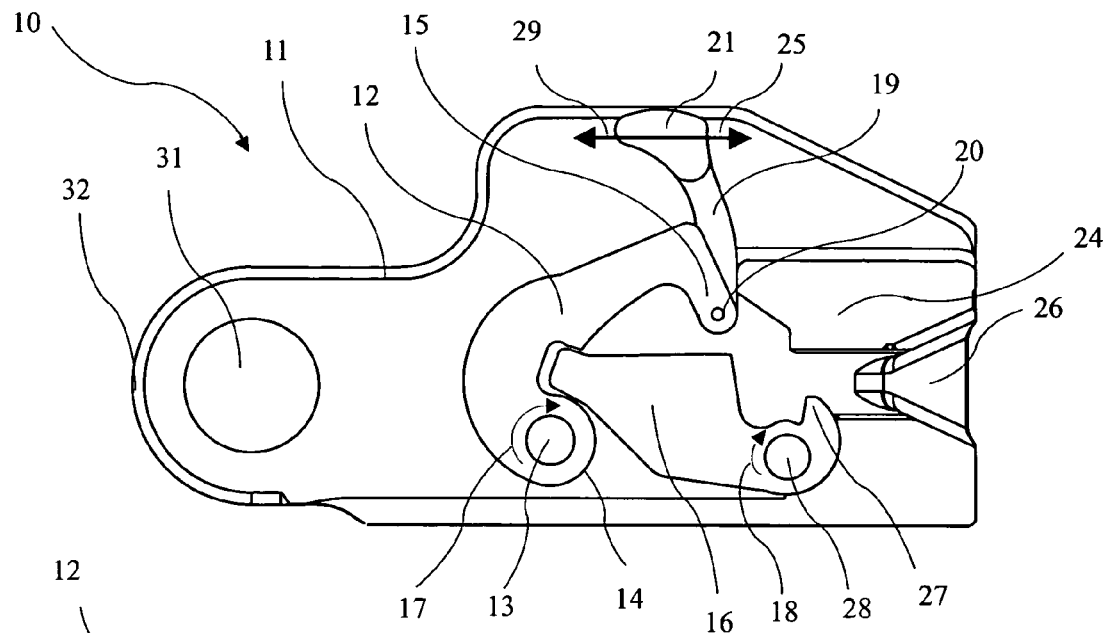
FIG. 1A is a detailed view of the actuating lever of the dual action canopy release buckle.
Figure 1A:
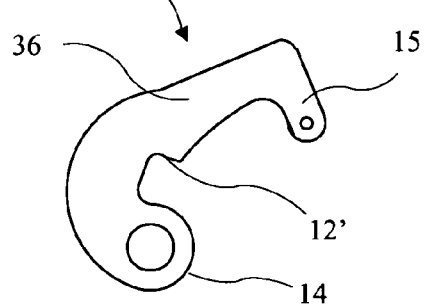

The buckle of the present invention is shown in a cross-sectional side view in FIG. 1 and indicated generally by reference character 10. Buckle 10 has a frame 11 which pivotally supports an actuating lever 12 by an actuating lever pivot pin 13 held by frame 11. Actuating lever 12 has a pivot end 14 and a distal end 15. Actuating lever 12 is biased in a clockwise direction as indicated by first arrow 17. Latch 16 is biased in a clockwise direction as indicated by second arrow 18. Actuating lever 12 supports a lever arm 19 by a lever arm pivot pin 20 positioned adjacent the distal end 15 of actuating lever 12. Lever arm 19 has a distal, finger-contacting end 21 (also called an actuating end) and a lever arm pivot end 22 (see FIG. 1B). Lever arm 19 also has a forward facing surface 23 (see FIG. 1B) which contacts contacting member 24 when lever arm 19 is moved in a forward direction indicated by arrow 25 and described in more detail below. In a manner analogous to the action of the buckle shown in U.S. Pat. No. 5,857,247, the buckle has a passageway 26 for insertion of a parachute strap holding tang not shown. This tang contacts tang tooth 27 which is lowered as latch 16 is moved in a clockwise direction about pivot pin 28. When the distal, finger-contacting end of lever arm 21 is moved in a rearward direction as indicated by arrow 29, the contacting end 30 (see FIG. 3) of actuating lever 12 prevents the lever arm 19 from pivoting about pivot pin 20 and instead, causes the actuating lever 12 to move in a counter clockwise direction as shown in FIG. 1 about actuating lever pivot pin 13.

Frame 11 has an opening 31 to hold a harness loop affixed to the air crew member. This opening is formed at the rearward end 32 of frame 11.

FIG. 1A is a detailed view of the actuating lever 12 of the dual action canopy release buckle 10. The actuating lever 12 defines a latch holding ledge arm portion 36, a pivot end of actuating lever 14, and a latch holding ledge 12' formed in actuating lever and prevents latch 16 from pivoting into an unlocked position.

Figure 1B:
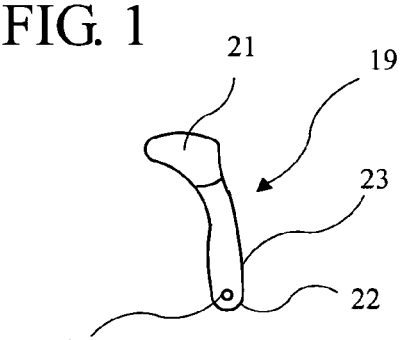
FIG. 1B is a detailed view of the lever arm of the dual action canopy release buckle.

FIG. 1B is a detailed view of the lever arm 19 of the dual action canopy release buckle 10. The lever arm 19 defines a finger contacting end 21 of lever arm 19, a pivot end 22 of lever arm 19, a forward facing surface 23 of lever arm 19, and a lever arm pivot pin 20.

Figure 1C:
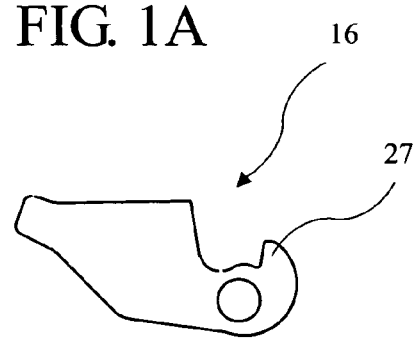
FIG. 1C is a detailed view of the latch of the dual action canopy release buckle.

FIG. 1C is a detailed view of the latch 16 of the dual action canopy release buckle 10. The latch defines a tang tooth 27.

Figure 1D:
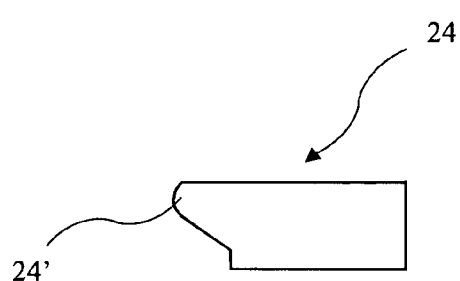
FIG. 1D is a detailed view of the contacting member of the dual action canopy release buckle.

FIG. 1D is a detailed view of the contacting member 24 of the dual action canopy release buckle 10. A rearward edge 24' of the contacting member 24 contacts the forward facing surface 23 of the lever arm 19.

Figure 2:
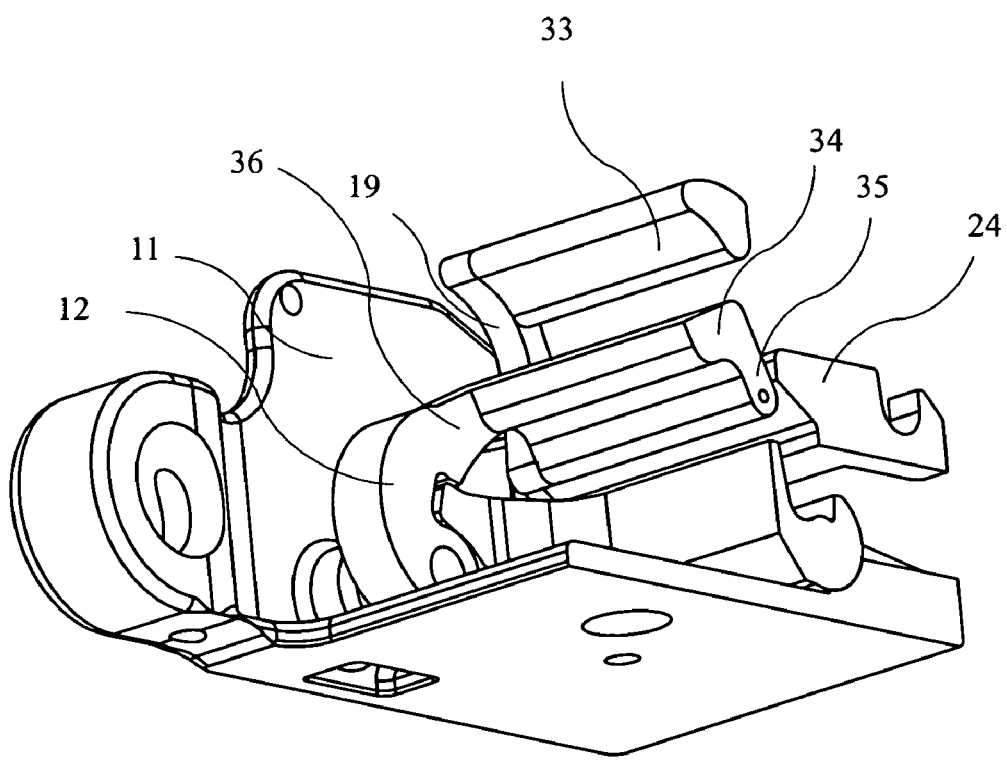
FIG. 2 is a perspective view, partly in cross-section, of the buckle of FIG. 1.
Figure 3:
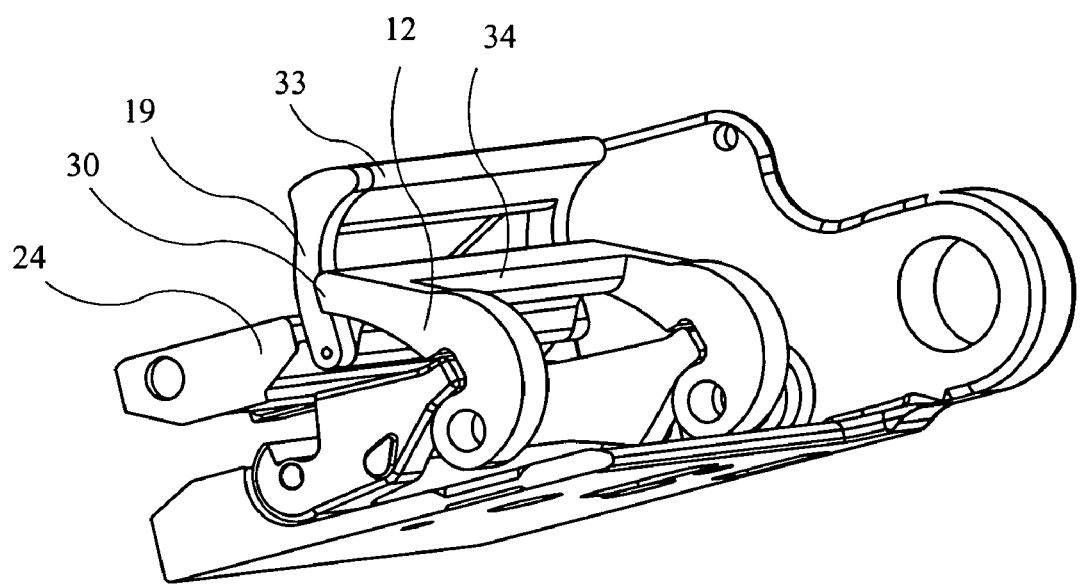
FIG. 3 is a perspective view, partially cut away, of the buckle arm of FIG. 1.

Further details of construction are shown in the views of FIGS. 2 and 3. There it can be seen that lever arm 19 supports a finger-contacting bar 33 in a bridging manner. It also can be seen that actuating lever 12 has a cross-arm portion 34 which supports a downwardly extending arm 35, which in turn contacts contacting member 24. Also, the latch holding ledge arm portion 36 of actuating lever 12 is shown clearly in FIG. 2.

FIG. 3 shows the detail of the contact between the lever arm 19 and the contacting end 30 of actuating lever 12. The contacting end 30 of the actuating lever resides adjacent to a portion of the lever arm 19 between the pivot end 22 and the finger contacting end 21.

Figure 4:
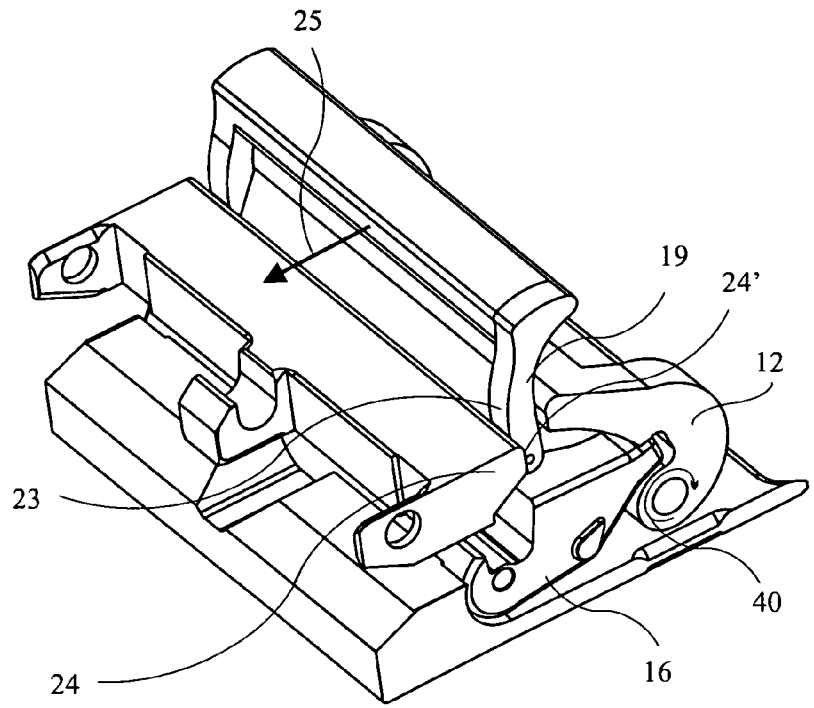
FIG. 4 is a perspective view, partially cut away, of the buckle of FIG. 1.

FIG. 4 shows the contact between the forward facing surface 23 of lever arm and the rearward edge 24' of the contacting member 24. It is also evident from FIG. 4 that the forward movement 25 of the lever arm 19 will cause surface 23 to contact the rearward edge 24' of the contacting member 24 and cause actuating lever to rotate in a clockwise direction 40, as viewed in FIG. 4. Of course, the terms "clockwise" and "counter clockwise" are used only to describe a particular view and will vary depending on which side of the buckle is being viewed. The claims using those terms are not intended to be limiting.

Figure 5:
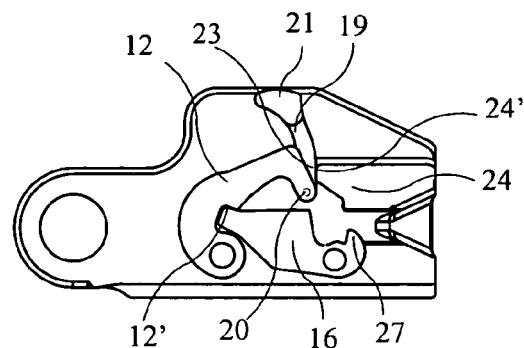
FIG. 5 is a cross-sectional view of the buckle of FIG. 1 in a latched configuration.
Figure 8:
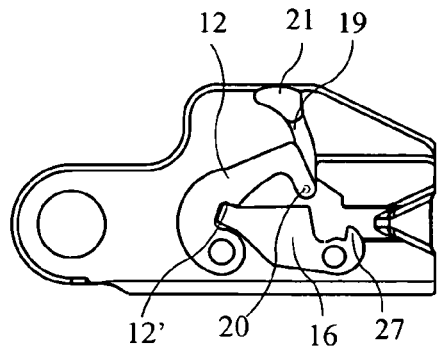
FIG. 8 is a cross-sectional view of the buckle of FIG. 1 in a latched configuration.
Figure 6:
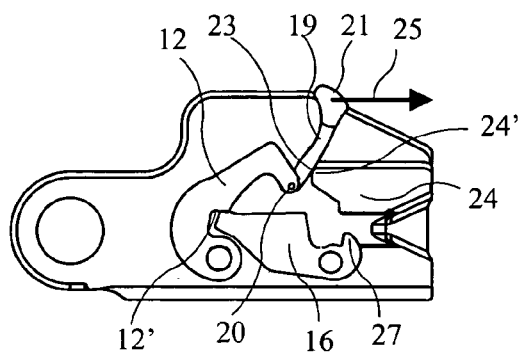
FIG. 6 is a cross-sectional view of the buckle of FIG. 1 with the lever arm in a partially forward position.
Figure 7:
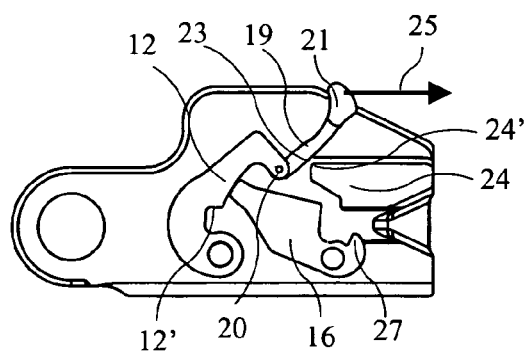
FIG. 7 is a cross-sectional view of the buckle of FIG. 1 with the lever arm in a fully forward position.

The action of the buckle is shown perhaps most clearly in FIGS. 5-10. FIG. 5 shows the buckle in a latched configuration. As the distal finger-contacting end 21 of lever arm 19 is moved in a forward direction 25, as shown in FIG. 6, the forward facing surface 23 of lever arm 19 contacts the rearward edge 24' of the contacting member 24. This causes lever arm pivot pin 20 to rise, thereby rotating actuating lever in a counter clockwise direction. This causes the latch holding ledge 12' to begin to release latch 16. As shown in FIG. 7, as the distal finger-contacting end 21 of lever arm 19 is moved to a fully forward position, the latch holding ledge 12' has released latch 16 and permitted it to move in a clockwise direction and lowered tang tooth 27, which releases the hold on the parachute canopy strap assembly.

Figure 9:
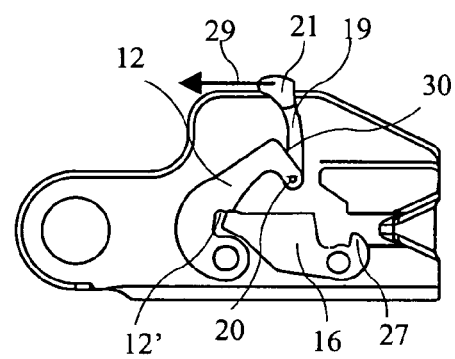
FIG. 9 is a cross-sectional view of the buckle of FIG. 8 with the lever arm in a partially rearward position.
Figure 10:
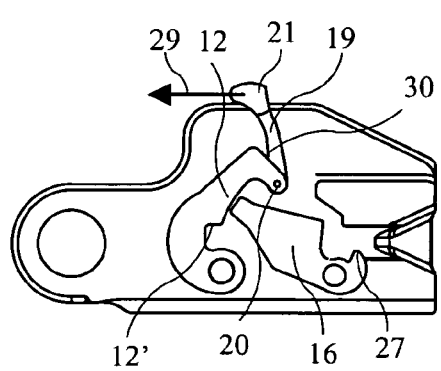
FIG. 10 is a cross-sectional view of the buckle of FIG. 8 with the lever arm in a fully rearward position.

FIG. 8, once again as in FIG. 5, shows the buckle in a latched configuration. As the distal finger-contacting end 21 of lever arm 19 is moved rearwardly 29, as shown in FIG. 9, lever arm 19 contacts the contacting end 30 of actuating lever 12. This causes the lever arm 19 and the actuating lever 12 to act as a single unit and to pivot in a counter clockwise direction about pivot pin 13. As shown in FIGS. 9 and 10, this causes the latch holding ledge 12' to release the latch 16 and once again permit it to move in a clockwise direction, releasing the parachute canopy harness assembly.

Figure 11:
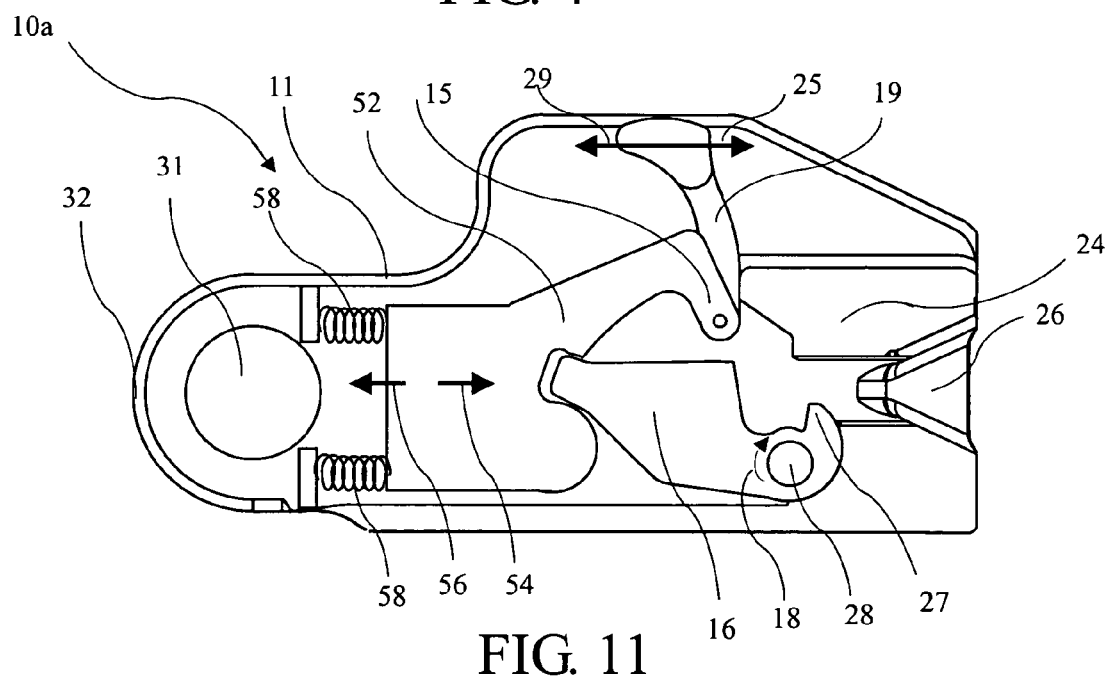
FIG. 11 is a cross-sectional view of an embodiment of the present invention which includes a activating slide.

Another embodiment of the present invention includes an actuating slide 52 shown in FIG. 11. The actuating slide 52 has a first slide position wherein the actuating slide 52 holds the latch 16 in the locked position, and the actuating slide 52 has a second slide position wherein the actuating slide 52 releases the latch 16 thereby allowing the latch 16 to move to the unlocked position The a first slide arrow 54 indicates the direction the actuating slide 52 is moved in to place the actuating slide 52 in the first slide position, and the second slide arrow 56 indicates the direction the actuating slide 52 is moved in to place the actuating slide 52 in the second slide position. The actuating slide 52 is preferably biased in the first slide position by springs 58. The result is a latch assembly which may be operated by moving the end of the lever arm in either direction.

Further to the buckle described above, the present invention contemplates any dual action release buckle comprising a frame, a latch moveably connected to the frame and adapted for releasably holding a tang in the buckle, an actuating member (for example, the actuating lever described above) moveably connected to the frame and mechanically cooperating with the latch, a moveable lever arm having a lever arm actuating end (also called a finger-contacting end) and a lever arm pivot end pivotally coupled to the actuating member, a contacting end of the actuating member residing proximal to the lever arm, and a contacting member fixedly connected to the frame and proximal to a side of the lever arm opposite the actuating member and between the actuating end and the distal end. The latch having a locked position wherein the tang is held, and an unlocked position wherein the tang is released. The actuating member having a first position, wherein the latch is held in the locked position, and a second position, wherein the latch is free to move to the unlocked position. The actuating member may be pivotally coupled to the frame by an actuating lever pivot pin, or the actuating member may be a sliding member slideably coupled to the frame, and may further be biased into the first position.

The present invention is further intended to contemplate any buckle including an actuating member adapted to directly couple a motion of the lever arm in a first direction into a motion of the actuating member from the first position to the second position and to indirectly couple a motion of the lever arm in a second direction into a motion of the actuating member from the first position to the second position. Any actuating member structure wherein motion of the lever arm towards the actuating member is limited in a manner in which the motion of the lever arm is directly coupled into a motion of the actuating member, is intended to come within the scope of the present invention. Additionally, any contacting member structure wherein cooperation of a contacting member with a lever arm, wherein motion of the lever arm actuating end in a second direction is inversely coupled to the actuating member, is intended to come within the scope of the present invention. The actuating end of the lever arm may comprise a finger-contacting end adapted for manual manipulation, and preferable requires between approximately two pounds force to approximately fifteen pounds force to move the actuating member from the first position to the second position.

The present embodiments of this invention are thus to be considered in all respects as illustrative and not restrictive;

the scope of the invention being indicated by the appended claims rather than by the foregoing description. All changes which come within the meaning and range of equivalency of the claims are intended to be embraced therein.

We claim:

1. A dual action canopy release buckle for releasably holding a parachute harness securement strap, said buckle having a frame with a forward end and a rearward end supporting a latch which may be pivoted between a locked-counterclockwise position and a released-clockwise position and being biased in a released-clockwise position and said latch being held in a locked-counterclockwise position by contact with a latch holding ledge supported by an actuating lever, said actuating lever having a distal end and a pivot end and said actuating lever being pivotable between a latch holding-clockwise position and a latch releasing-counterclockwise position and said actuating lever being biased toward a latch holding-clockwise position, wherein the improvement comprises:
  a lever arm pivotally held on the distal end of said actuating lever and extending upwardly therefrom and said lever arm having a distal, finger-contacting end and a pivot end, whereby when said distal, finger-contacting end of said lever arm is moved rearwardly the lever arm contacts a contacting end of said actuating lever and pulls the distal end of said actuating lever so that the actuating lever rotates in a counterclockwise direction to a latch releasing-counterclockwise position;
  a forward facing surface of said lever arm; and
  a contacting member secured to said frame and positioned so that a rearward edge of said contacting member contacts said forward facing surface of said lever arm at a point above said lever arm pivot pin whereby when said distal, finger contacting end of said lever arm is moved forwardly, said forward facing surface contacts said rearward edge and lifts the lever arm pivot pin thereby rotating said actuating lever in a counterclockwise direction to a latch releasing counterclockwise position whereby a dual action lever results in releasing the latch when the distal, finger contacting end of said lever arm is moved in a forward direction or a rearward direction.

2. The dual action canopy release buckle of claim 1 wherein said lever arm pivot pin is secured to a downwardly extending arm at the distal end of said actuating lever.

3. The dual action canopy release buckle of claim 1 wherein the rearward motion of the distal, finger-contacting end of said lever arm is limited by contact with the contacting end of said actuating lever.

4. The dual action canopy release buckle of claim 1 wherein said actuating lever includes a cross arm portion which extends inwardly from a latch holding ledge arm portion of said actuating lever.

5. A dual action release buckle comprising:
  a frame;
  a latch moveably connected to the frame and adapted for releasably holding a tang in the buckle, the latch having a locked position wherein the tang is held, and an unlocked position wherein the tang is released;
  an actuating member moveably connected to the frame and mechanically cooperating with the latch, wherein in a first position, the actuating member holds the latch in the locked position, and in a second position, the actuating member releases the latch thereby allowing the latch to move to the unlocked position;
  a lever arm having a lever arm actuating end and a lever arm pivot end spaced apart from the actuating end, wherein the lever arm pivot end is pivotally coupled to the actuating member
  a contacting end of the actuating member residing proximal to the lever arm; a contacting member fixedly connected to the frame and residing proximal to a side of the lever arm opposite the actuating member, and between the actuating end of the lever arm and the lever arm pivot end, and wherein:
  motion of the lever arm actuating end in a first direction is directly coupled to the actuating member through contact of the lever arm with the contacting end of the actuating member, whereby the actuating member is movable from said first position to said second position; and
  motion of the lever arm actuating end in a second direction is inversely coupled to the actuating member through the lever arm pivot end, wherein the lever arm contacts and pivots about the contacting member, whereby the actuating member is movable from said first position to said second position.

6. The buckle of claim 5, wherein the contacting end is positioned to contact the lever arm between the lever arm actuating end and the lever arm pivot end.

7. The buckle of claim 5, wherein the actuating member comprises an actuating lever pivotally coupled to the frame.

8. The buckle of claim 7, wherein the actuating lever is pivotally coupled to the frame by an actuating lever pivot pin.

9. The buckle of claim 5, wherein the actuating member comprises an actuating slide slideably coupled to the frame.

10. The buckle of claim 5, wherein the actuating member is biased into said first position.

11. The buckle of claim 5, wherein said latch is biased into the unlocked position.

12. The buckle of claim 5, wherein the actuating end of the lever arm includes a finger-contacting end adapted for manual manipulation.

13. The buckle of claim 5, wherein the lever arm pivot end is pivotally coupled to the actuating lever by a lever arm pivot pin.

14. The buckle of claim 5, wherein the latch is moveably connected to the frame and adapted for releasably holding a tang of a parachute harness securement strap in the buckle.

15. The buckle of claim 5, wherein the actuating end of the lever arm required between approximately two pounds force to approximately fifteen pounds force to move the actuating member from the first position to the second position.

16. A dual action canopy release buckle comprising:
  a frame;
  a latch moveably connected to the frame and adapted for releasably holding a tang of a parachute harness securement strap in the buckle, the latch having a locked position wherein the tang is held, and an unlocked position wherein the tang is released;
  an actuating lever pivotally connected to the frame and mechanically cooperating with the latch, wherein in a first position, the actuating lever holds the latch in the locked position, and in a second position, the actuating lever releases the latch thereby allowing the latch to move to the unlocked position;
  a lever arm moveably connected to the frame and having a lever arm actuating end and a lever arm pivot end, wherein the lever arm pivot end is pivotally coupled to the actuating lever;

a contacting end of the actuating lever residing adjacent to a portion of the lever arm between the lever arm pivot end and the lever arm actuating end; and a contacting member fixedly connected to the frame and residing proximal to a side of the lever arm opposite the actuating lever, and between the actuating end and the pivot end, and wherein:

motion of the lever arm actuating end in a first direction is directly coupled to the actuating lever through contact of the lever arm with the contacting end of the actuating lever, whereby the actuating lever is movable from said first position to said second position of said actuating lever; and motion of the lever arm actuating end in a second direction is inversely coupled to the actuating member through the lever arm pivot end, wherein the lever arm contacts and pivots about the contacting member, whereby the actuating member is movable from said first position to said second position.

17. The buckle of claim 16, wherein the actuating end of the lever arm required between approximately two pounds force to approximately fifteen pounds force to move the actuating member from the first position to the second position.

18. The buckle of claim 16, wherein the actuating lever is biased into said first position.

19. The buckle of claim 16, wherein the actuating end of the lever arm includes a finger-contacting end adapted for manual manipulation.

20. The buckle of claim 16, wherein said latch is biased into the unlocked position.

* * * * *